(12) United States Patent
Aggarwal et al.

(10) Patent No.: US 6,307,965 B1
(45) Date of Patent: *Oct. 23, 2001

(54) SYSTEM AND METHOD FOR DETECTING CLUSTERS OF INFORMATION

(75) Inventors: Charu Chandra Aggarwal, Yorktown Heights; Joel Leonard Wolf, Goldens Bridge; Philip Shi-Lung Yu, Chappaqua, all of NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/070,600

(22) Filed: Apr. 30, 1998

(51) Int. Cl.[7] .................................................... G06K 9/62

(52) U.S. Cl. ................................................... 382/225

(58) Field of Search .................................. 382/218, 219, 382/220, 221, 223, 224, 225, 226, 229, 230; 704/245, 240, 255, 251, 278

(56) References Cited

U.S. PATENT DOCUMENTS

| | | | |
|---|---|---|---|
| 5,034,981 | * 7/1991 | Leonard et al. | 380/5 |
| 5,526,446 | * 6/1996 | Adelson et al. | 382/275 |
| 5,872,850 | * 2/1999 | Klein et al. | 380/49 |
| 6,009,392 | * 12/1999 | Kanevsky et al. | 704/245 |

OTHER PUBLICATIONS

R. Sibson, "SLINK: An Optimally Efficient Algorithm for the Single–Link Cluster Method", *The Computer Journal*, The British Computer Society, vol. 16, No. 1, Feb. 1973.

Tian Zhang et al., "BIRCH: An Efficient Data Clustering Method for Very Large Databases", Proceedings of the ACM SIGMOND International Conference on Management of Data, Montreal, Canada, Jun. 1996, pp. 103–114.

Raymond T. Ng et al., "Efficient and Effective Clustering Methods for Spatial Data Mining", Proceedings of the 20th International Conference on Very Large Data Bases, Santiago, Chile, 1994, pp. 144–155.

Nick Roussopoulos et al., "Nearest Neighbor Queries", Proceedings of the ACM–SIGMOD International Conference on Management of Data, 1995, pp. 71–79.

Stefan Berchtold et al., "Fast Nearest Neighbor Search in High–dimensional Space", Proceedings of the International Conference on Data Engineering, Feb. 1998, pp. 209–218.

David A. White et al., "Similarity Indexing with the SS–Tree", Proceedings of the 12th International Conference on Data Engineering, New Orleans, U.S.A., Feb. 1996, pp. 516–523.

(List continued on next page.)

*Primary Examiner*—Andrew W. Johns
*Assistant Examiner*—Seyed Azarian
(74) *Attorney, Agent, or Firm*—F. Chau & Associates, LLP (57) ABSTRACT

A system and method are provided to analyze information stored in a computer data base by detecting clusters of related or correlated data values. Data values stored in the data base represent a set of objects. A data value is stored in the data base as an instance of a set of features that characterize the objects. The features are the dimensions of the feature space of the data base. Each cluster includes not only a subset of related data values stored in the data base but also a subset of features. The data values in a cluster are data values that are a short distance apart, in the sense of a metric, when projected onto a subspace that corresponds to the subset of features of the cluster. A set of k clusters may be detected such that the average number of features of the subsets of features of the clusters is l.

25 Claims, 5 Drawing Sheets

OTHER PUBLICATIONS

Stefan Berchtold et al., "The X–Tree: An Index Structure for High–Dimensional Data", Proceedings of the 22$^{nd}$ International Conference in Very Large Databases, 1996, pp. 28–39.

Douglas H. Fisher, "Knowledge Acquisition Via Incremental Conceptual Clustering", Machine Learning 2(2), 1987, pp. 139–172.

Mohamed Zait et al., "A Comparative Study of Clustering Methods", FGCS Journal, Special Issue on Data Mining, 1997, pp. 149–159.

Samet H., Design and Analysis of Spatial Datastructures, Addison Wesley, 1993, pp. 135–141.

* cited by examiner

SYSTEM AND METHOD FOR DETECTING CLUSTERS OF INFORMATION

FIELD OF THE INVENTION

The present invention relates in general to finding clusters of information in high dimensional feature spaces. Clusters are associated with a selection of features of the information. In particular, related information in a database is identified by detecting clusters of information and subsets of cluster specific features, about which the information is clustered.

BACKGROUND OF THE INVENTION

It is often desirable to detect sets of related instances in a database that correspond to related information. Instances of information are represented and stored in a database in the form of a set of data values in a multidimensional space. A dimension in the multidimensional space is a feature that characterizes objects represented by the data values. For example, consider an insurance company's database containing customer information. Each customer is an object corresponding to an instance in the database that is a customer profile, or data value, in the multidimensional feature space of the database. Each data value is an n-tuple corresponding to an instance of the features: age, sex, salary, of the customer as well as the number of cars owned by the customer. The dimensions of the multidimensional feature space are the features that characterize the customer namely the age, sex, salary, of the customer and number of cars owned by the customer.

The problem of clustering is the problem of finding sets of data values in a multidimensional feature space that are close to each other, in the sense of some metric, measure or the like, with respect to a particular subset of dimensions. A particular subset of dimensions is a subset of the features that characterize the objects represented by data values stored in the database, and is thus associated with a subspace in the multidimensional feature space. The cluster problem is a known problem in the database literature, for example D. Fisher, "Knowledge Acquisition via Incremental Conceptual Clustering", *Machine Learning* 2(2), 1987; T. Zhang, R. Ramakrishnan and M. Livny, "BIRCH: An Efficient Data Clustering Method for Very Large Databases", *Proceedings of the ACM SIGMOD International Conference on Management of Data*, Montreal, Canada, June 1996; R. Ng and J. Han, "Efficient and Effective Clustering Methods for Spatial Data Mining", *Proceedings of the 20th International Conference on Very Large Data Bases*, Santiago, Chile, 1994, pp. 144–155; and M. Zait and H. Messatfa, "A Comparative Study of Clustering Methods", *FGCS Journal, Special Issue on Data Mining*, 1997. The clustering problem has numerous applications that relate to other problems such as segmentation, classification, collaborative filtering/data mining and trend analysis. It is also known that existing algorithm designed to solve the problem of clustering break down in high dimensional feature spaces. The difficulty that arises in high dimensional feature spaces is the inherent sparsity of data values. For example, in the above case when objects represented in the database as customer profiles, there may not be many clusters of customer profiles that are similar (close) with respect to all the features: age, sex, salary, number of cars, etc. Thus, when the number of features is high the data may become sparse.

In high dimensional feature spaces, however, only some of the features may be relevant when finding clusters. Therefore, one approach to handling high dimensional feature spaces is to select closely correlated features, project out or ignore the other features, and find clusters in the corresponding subspace. This approach is problematic, however, as it is difficult to find a single subset of features, i.e. one subspace, in which data values cluster well. In other words, different subsets of data values may cluster better for different subsets of features or subspaces.

The clustering problem has been discussed in the literature of both the statistical and database communities. The emphasis in the statistical community is to find clusters based on precisely defined metrics, while the emphasis in the database community is to produce methods for detecting clusters that work efficiently on large data sets. Two known algorithms for finding clusters in large databases are the BIRCH and CLARANS, see T. Zhang, R. Ramakrishnan and M. Livny, supra, and R. Ng and J. Han, supra.

As explained above, many clustering algorithms do not work efficiently in higher dimensional feature spaces because of the sparsity of the data. In many applications, execution of a clustering algorithm is preceded by feature selection. It is desirable to select particular features so that the data values in the feature space are correlated to each other in the subspace associated with the selected features. Pruning away or projecting out undesirable features reduces the number of uncorrelated so features that add noise to the data.

The problem of using traditional feature selection methods is that picking certain features in advance leads to a loss in information. Furthermore, in many data sets, some data values are related with respect to a given set of features and others are correlated with respect other features. Thus, it is often infeasible to prune away or project out too many features without at the same time incurring a substantial loss in information.

Figure 1A:
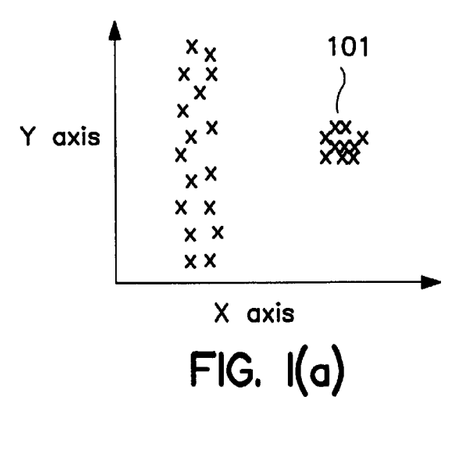
Figure 1B:
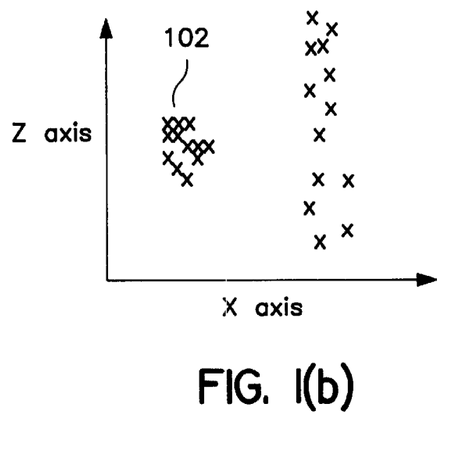

In order to illustrate this point, consider the following example. In FIG. 1(a) and FIG. 1(b), two different feature subspaces are illustrated. On each subspace the projection of a set of data values in 3-dimensional feature space is shown. Two patterns of the data emerge: the first pattern corresponds to the cluster 101 of data values in the X-Y plane, while the second pattern corresponds to the cluster 102 of data values in the X-Z plane.

It is advantageous to identify a way of expressing and representing such patterns. Feature pre-selection does not seem an appropriate option, because each feature is relevant to at least one of the clusters. In other words, the "closeness" of data values projected into different subspaces of the 3-dimensional feature space is not uniform with respect to the different features.

In the context of a database of customer profiles that include information about the age, sex, salary, and number of cars, it may be the case that the number of cars owned by a given customer is related in a variety of different patterns depending on whether attention is restricted to customer age or sex or salary or all of the above. Hence, different clusters are found in different subspaces depending on which set of features is considered.

SUMMARY OF THE INVENTION

The present invention includes a system and method for analyzing information in the form of a plurality of data values that represent a plurality of objects. A plurality of objects are collected. A set of features that characterize each object is identified. The plurality of data values are stored in a database. Each of the plurality of data values correspond to at least one of the plurality of objects based on the set of features. A set of clusters of information is detected in the database by associating ones of the plurality of data values with ones of the set of features.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 1($a$) and FIG. 1($b$) are graphical illustration of clusters in two different feature subspaces.

DETAILED DESCRIPTION OF THE INVENTION

Figure 2:
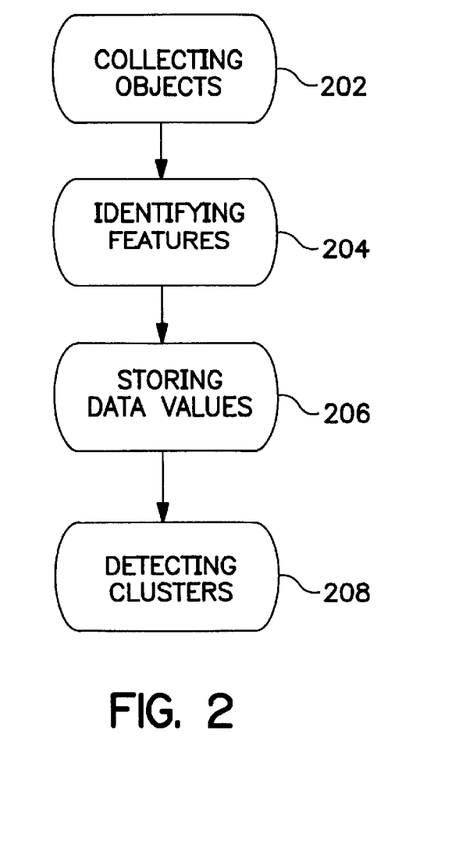
FIG. 2 is a flow chart diagram which is useful for explaining a method of analyzing information in a database in accordance with an exemplary embodiment of the present invention.

FIG. 2 is a flow chart diagram which is useful for explaining a method of analyzing information in a database in accordance with an exemplary embodiment of the present invention. The method summarized by the flow chart diagram of FIG. 2 is a method of analyzing information characterizing a physical plurality of objects collected in step 202. A set of features of the physical objects are identified in step 204. For example, objects may correspond to people, and features characterizing objects may correspond to age, sex, salary, and social insurance number.

In step 206 the information characterizing each object is stored in a data base as data values. A data value represents an instance of the set of features as measured from a physical object. For example, if objects are people and if the set of features includes sex then instances of sex would be either male or female depending of the particular person. Thus, the set {35, female, 80, 001-02-0003} is an example of a data value representing an instance of the set of features {age, sex, salary, social insurance number} corresponding to a 35 year old female person, with a salary of 80 thousands of a currency, and with social insurance number 001-02-0003. Note that it is herein assumed that all features may be given a numerical value. For example, the instances of sex, male and female may be given numerical values 0, 1 respectively.

Finally, in step 208 clusters of information are detected by associating subsets of the data values with subsets of the set of features. Consider, for example, a data base belonging to a car insurance agent. The objects in the data base are people and the set of features includes: age, sex, marital status, number of accidents, and year vehicle owned was manufactured. An example of a cluster of information in this scenario may be a first group of people that are close in age and in the number of accidents they have been involved in as well as a second group of people that are close in age and own vehicles manufactured around the same time. The data values corresponding to the first group of people are associated with the features {age, number of accidents} and the second group of people are associated with the features {age, year vehicle owned was manufactured}. Note that the first group of people and the second group of people may be the same, overlapping, or non-intersecting.

A cluster, written symbolically herein as a pair (F, P), is in this context a subset of data values, say P, and a subset of the set of features, say F, such that the elements of the subset of data values, $\forall p \in P$, are close to each other in the sense of some metric taken with respect to the subspace associated with F. In other words, when deciding whether elements p of a subset of data values P are in some sense close to each other, "closeness" is measured with respect to a subset of the features F. In a sense, restricting attention to a subset of the features F is like considering a projection of the subset of data values P onto the subspace associated with F along with the metric induced in that subspace. For example, it may be the case that two people are close in age and in the number of accidents they have been involved in but one of the two owns a much older car than the other. Hence, these two people are the elements of a subset of the set of all people corresponding to data values in a data base. The data values corresponding to these two people combined with the subset of features {age, and number of accidents} form a cluster.

It is possible to define various quantities related to clusters such as, for example, the mass of a cluster, the centroid of a cluster and the radius of a cluster. Let $P=\{x_1, x_2, \ldots, x_m\}$ be the subset of data values of a cluster C. The mass of cluster C is equal to the number of data values in P or the cardinality of P. Thus, the mass of the cluster C is m. The centroid of a cluster is the algebraic average of all the data values in the cluster. Thus, the centroid of the cluster C is given by the linear sum of the data values in P divided by the mass of the cluster C. The radius of the cluster C is the average distance of data values in P from the centroid of the cluster, given a specific distance metric.

Two possible metrics for calculating distances between data values are the manhattan metric and the Euclidean metric. The Euclidean distance between two data values $m=(m_1, \ldots, m_r)$ and $n=(n_1, \ldots, n_r)$ is given by $$\sqrt{\sum_{i=1}^{r}(m_i - n_i)^2}. \tag{1}$$

The Manhattan distance is given by $$\sum_{i=1}^{r}|m_i - n_i|. \tag{2}$$

A method in accordance with the present invention may be implemented with various metrics including the Euclidean metric and the manhattan distance. In general, the $L_p$ norm induced distance metric between two data values $m=(m_1, \ldots, m_r)$ and $n=(n_1, \ldots, n_r)$ is defined as $$\|m-n\|_p = \left[\sum_{i=1}^{r}|m_i - n_i|^p\right]^{1/p}. \tag{3}$$

The $L_p$ norm induced segmental distance between two data values $m=(m_1, \ldots, m_r)$ and $n=(n_1, \ldots, n_r)$ is defined by $$\frac{\|m-n\|_p}{r}. \quad (4)$$

Thus, the $L_p$ norm induced segmental distance between two data values is an average length.

Figure 3:
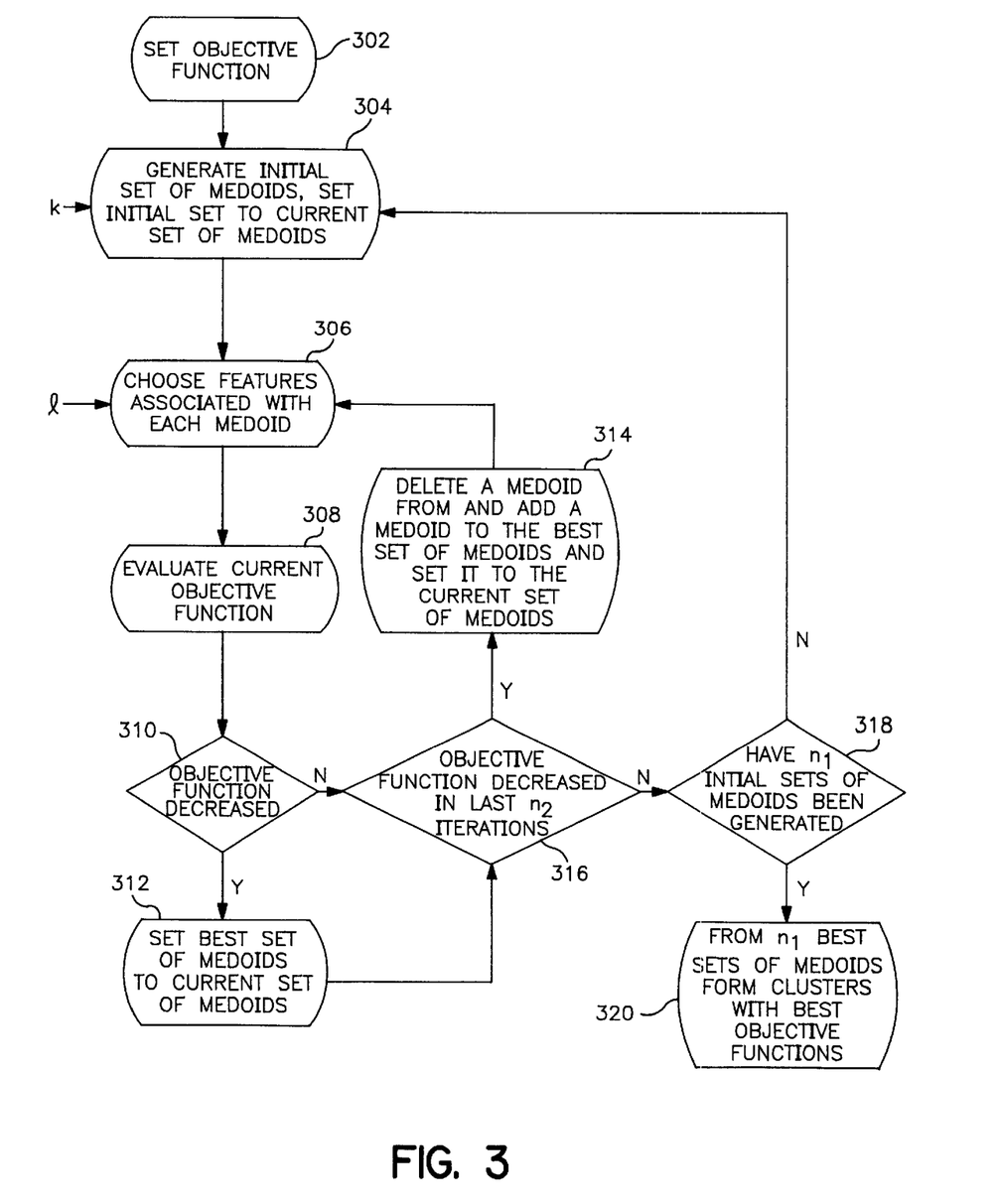
FIG. 3–FIG. 6 are flow chart diagrams which are useful for explaining a method of analyzing information in a database in accordance with an exemplary embodiment of the present invention.

FIG. 3 shows a flow chart diagram of an exemplary embodiment of a method of analyzing information in a database in accordance with the present invention. In step 302 an objective function is set to a high value. The high value is computed by first finding the range of values taken by data values with respect to each feature. For example, if one of the features is age and the range of ages of customers, corresponding to data values in the database, is between 13 and 72, then the range of values taken by data values with respect to the feature of age is 59. Second, a sum of the ranges taken by data values with respect to each feature is calculated. The objective function is set to the high value in step 302 equaling the total number of data values stored in the data base multiplied by the sum of the ranges taken by data values. The objective function is used to quantitatively evaluate the quality of clusters detected. The lower the objective value the higher the quality of the clusters detected. In step 304 an initial set of k medoids is generated and set to the current set of medoids, where k is an integer provided by a user. Medoids are simply data values stored in the data base. The initial set of medoids may be generated, for example, at random. The k medoids are generated as an initial guess for locations in the database in which k clusters may be detected. A good set of medoids may contain a representative data value from each cluster to be detected.

In step 306 a subset $F_1$ of the set of features is associated with each medoid such that the average number of features associated with each medoid is l, where l is an integer provided by a user. A subset associated with a medoid has a dimensionality value that is the number of features in the subset, written herein $|F_i|$. The integer l is thus the average of the dimensionality values $|F_i|$ over the k subsets of features associated with the k medoids. Allowing an average of the dimensionality values as a user input has the advantage of providing a user the flexibility of determining the average number of features of the k clusters to be detected. As explained in greater detail below the medoids are used as anchor data values about which clusters may be detected.

In step 308, using the medoids as k anchor data values, the data values stored in the data base are partitioned into k sets $P_i$, i=1, . . . ,k, of data values, where each set of the partition forms a potential set of new clusters $C_i=(F_i, P_i)$, i=1, . . . ,k. The partition of data values into the sets $P_i$, i=1, . . . ,k, may be accomplished by assigning data values to each of the medoids using, for example, a single pass over the database. Data values may be assigned to the medoids in such a way that, for example, an average segmental distance such as, for example, the $L_p$ norm induced segmental distance, or the like, is minimized. The quality of the potential new clusters $C_i=(F_i, P_i)$, i=1 , . . . , k is evaluated using an objective function. The objective function may be, for example, the average segmental distance from the centroids of the potential new clusters to the data values in the respective clusters. Note that the centroid of a cluster will, in general, differ from the medoid.

In step 310 a comparison test is performed to determine whether the current value of the objective function is lower than the previous value of the objective function. If it is, then the set of medoids used as anchor data values for the potential new clusters $C_i=(F_i, P_i)$, i=1 , . . . ,k are considered a best set of medoids.

The best set of medoids are associated with the current highest quality clusters detected. If the objective function is not lower than the previous value then step 312 is skipped and the method proceeds with step 316.

In step 312, once a decrease in the objective unction value is sensed, the current set of medoids is set to the best set of medoids. On the other hand, if the value of the objective function has not decreased then in step 316 a test is performed to see whether the objective function value has decreased in the last $n_2$ iterations of steps 314, 306, and 308. If the objective function value has decreased in the last $n_2$ iterations then in step 314 a medoid is deleted and a nedoid is added to the best set of medoids, and the set of new medoids is set to the current set of medoids. If the objective function value has not decreased in the last $n_2$ iterations then a test is performed in step 318 to determine whether $n_1$ initial sets of medoids have been generated in step 304. If $n_1$ initial sets of medoids have not been generated then an initial set of new medoids is again generated in step 304. If $n_1$ initial sets of medoids have been generated then $n_1$ potential sets of clusters have been detected. In other words, for each of the $n_1$ iterations of the steps in FIG. 3 a potential set of k clusters has been detected. The set of k clusters (out of the $n_1$ potential sets) corresponding to the lowest value of the objective function is chosen and reported to a user. The set of clusters of information detected in the data base may be displayed to a user in the form of text or in graphical form.

Figure 4:
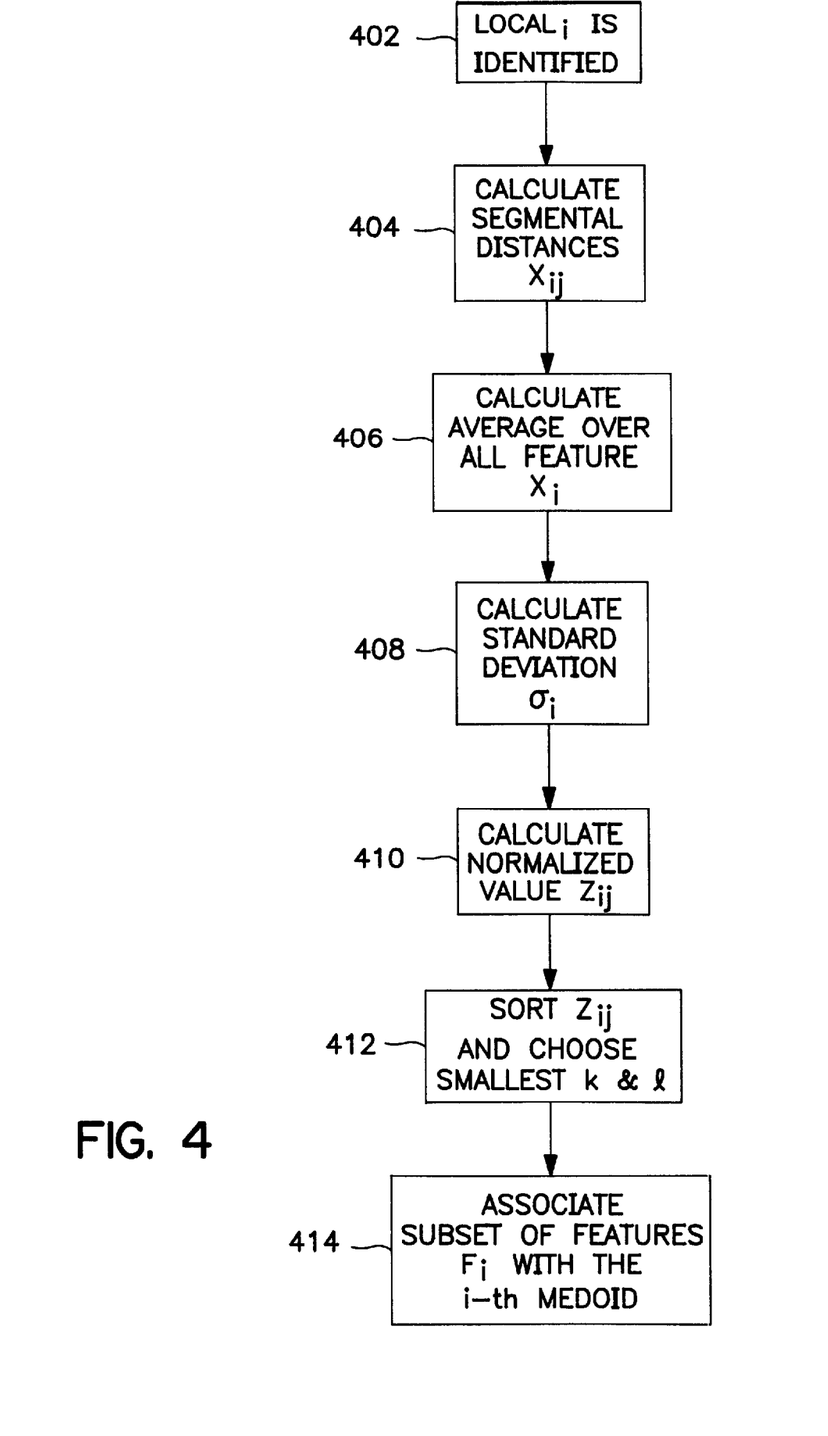

FIG. 4 shows a flow chart diagram which is useful for explaining a method of analyzing information in a database in accordance with an exemplary embodiment of the present invention. The flow chart diagram of FIG. 4 may be considered a more detailed explanation of a recipe for associating a subset of features with a set of medoids. The recipe detailed in FIG. 4 is hence a detailed explanation of step 306 of FIG. 3. In FIG. 4, step 402, a set of data values in a neighborhood (or sphere of influence), $Local_i$, of the $i^{th}$ medoid of the current set of medoids are identified.

In step 404 an average segmental distance from the data values in the neighborhood $Local_i$ to the $i^{th}$ medoid with respect to the $j^{th}$ feature of the set of features is calculated. Note that a distance between two data values $m=(m_j, \ldots, m_r)$ and $n=(n_j, \ldots, n_r)$ based on some metric $<,>$ with respect to the $j^{th}$ feature is given by $$<m,n>_j = <m_j, n_j>. \quad (5)$$

The average segmental distance from the data values in the neighborhood $Local_i$ to the $i^{th}$ medoid with respect to the $j^{th}$ feature of the set of features is herein written $x_{ij}$.

In step 406 the average value over all the features of the set of features of the average segmental distance, from the data values in the neighborhood $Local_i$ to the $i^{th}$ medoid with respect to the $j^{th}$ feature of the set of features, is calculated. In other words the average value, herein written $x_j$, of the values $x_{ij}$ is calculated over j.

In step 408 the standard deviation $\sigma_j$ of the average segmental distances with respect to the various features, $x_{ij}$, is calculated. In step 410 a normalized value $$z_{ij} = \frac{x_{ij} - x_i}{\sigma_i} \quad (6)$$

is computed. The value $z_{ij}$ indicates the relationship between the average segmental distances, from the data values in the neighborhood $Local_i$ to the $i^{th}$ medoid with respect to the $j^{th}$ feature of the set of features, and the average value $x_i$ over all features of the set of features. A negative value of $z_{ij}$ indicates that with respect to the $j^{th}$ feature, the data values in the neighborhood $Local_i$ tend to be correlated to the $i^{th}$ medoid.

In order to associate a set of features with each medoid such that the average number of features associated with each medoid is l, a total of k*l features for all medoids are chosen. In step 412 all values $z_{ij}$ are sorted in increasing order and the lowest k*l values are chosen, while ensuring that for each i at least one $z_{ij}$ is chosen. Analogously, in step 414 the $i^{th}$ medoid is associated with the subset of features, $F_i$, containing features that correspond to values of j such that $z_{ij}$ is among the lowest k*l values, as explained above.

Figure 5:
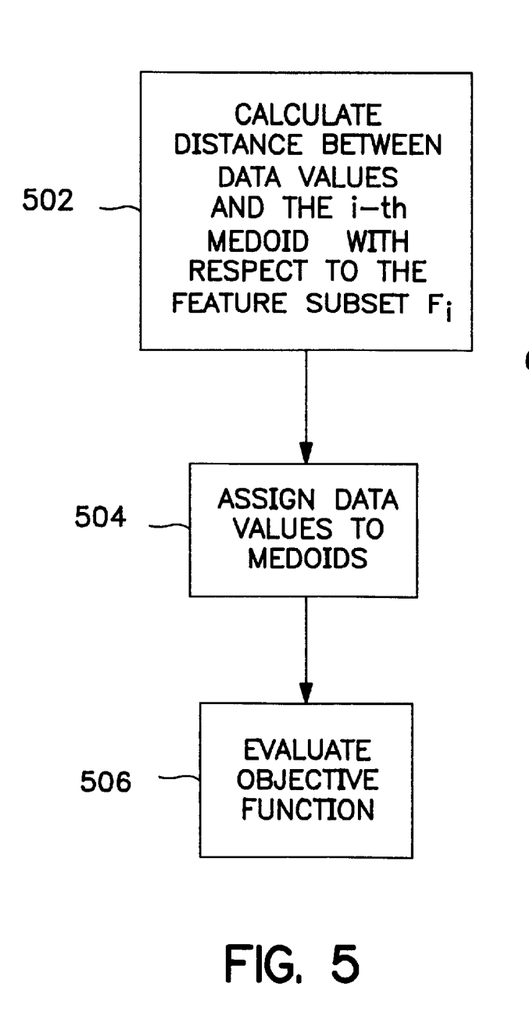

FIG. 5 shows a flow chart diagram which is useful for explaining a method of analyzing information in a database in accordance with an exemplary embodiment of the present invention. The flow chart diagram of FIG. 5 may be considered a more detailed explanation of the quantitative evaluation of the quality of potential clusters using an objective function. The recipe detailed in FIG. 5 is hence a detailed description of step 308 of FIG. 3. In step 502 a distance M(p, i) from the data value p to the $i^{th}$ medoid with respect to the subset of features $F_i$ is calculated. In step 504 the data values stored in the data base are partitioned into the sets $P_i$, i=1 , . . . ,k, by assigning data values to each of the medoids using, for example, a single pass over the database. A data value p is assigned to the $i^{th}$ medoid if the data value p is "closest" to the $i^{th}$ medoid in the sense that the distance measure M(p, i)/|$F_i$| is less than the distance measure M(p, j)/|$F_j$|, $\forall j \neq i$. In step 506 the quality of the potential set of new cluster ($F_j$, $P_j$) , is evaluated using an objective function that is the total average segmental distance between each data value in the database and the medoid to which the data value had been assigned in step 504. In a variation of step 506 it is possible to control the percentage of data values in the data base that are considered in the analysis of the information in the data base and in the detection of clusters. If a user specifies that only a percentage of the data values in the data base are to be included in the analysis then the same percentage of data values with the largest segmental distances from the medoids they had been assigned to may be deleted from the database.

Figure 6:
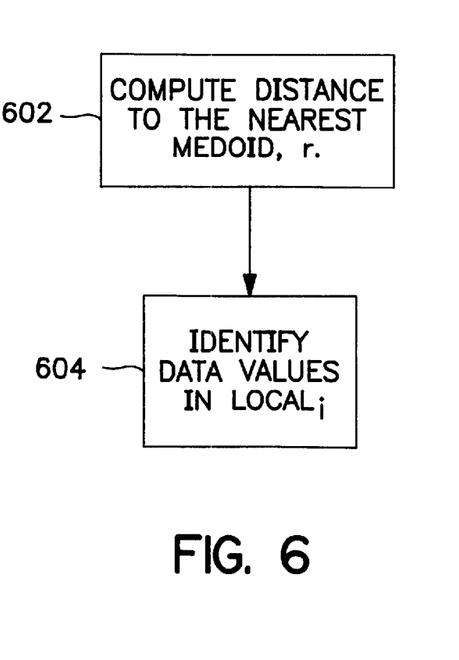

FIG. 6 shows a flow chart diagram which is useful for explaining a method of analyzing information in a database in accordance with an exemplary embodiment of the present invention. The flow chart diagram of FIG. 6 may be considered a more detailed explanation of the identification of the set of data values in a neighborhood (or sphere of influence), $Local_i$, of the $i^{th}$ medoid of the current set of medoids. The recipe detailed in FIG. 6 is hence a detailed description of step 402 of FIG. 4. In step 602 the distance r to the medoid nearest, in the sense of some metric, to the $i^{th}$ medoid is computed. The set of data values in the sphere of influence $Local_i$ of the $i^{th}$ medoid is identified in step 604 to be the set of values in the neighborhood of data values centered at the $i^{th}$ medoid with radius r.

Figure 7:
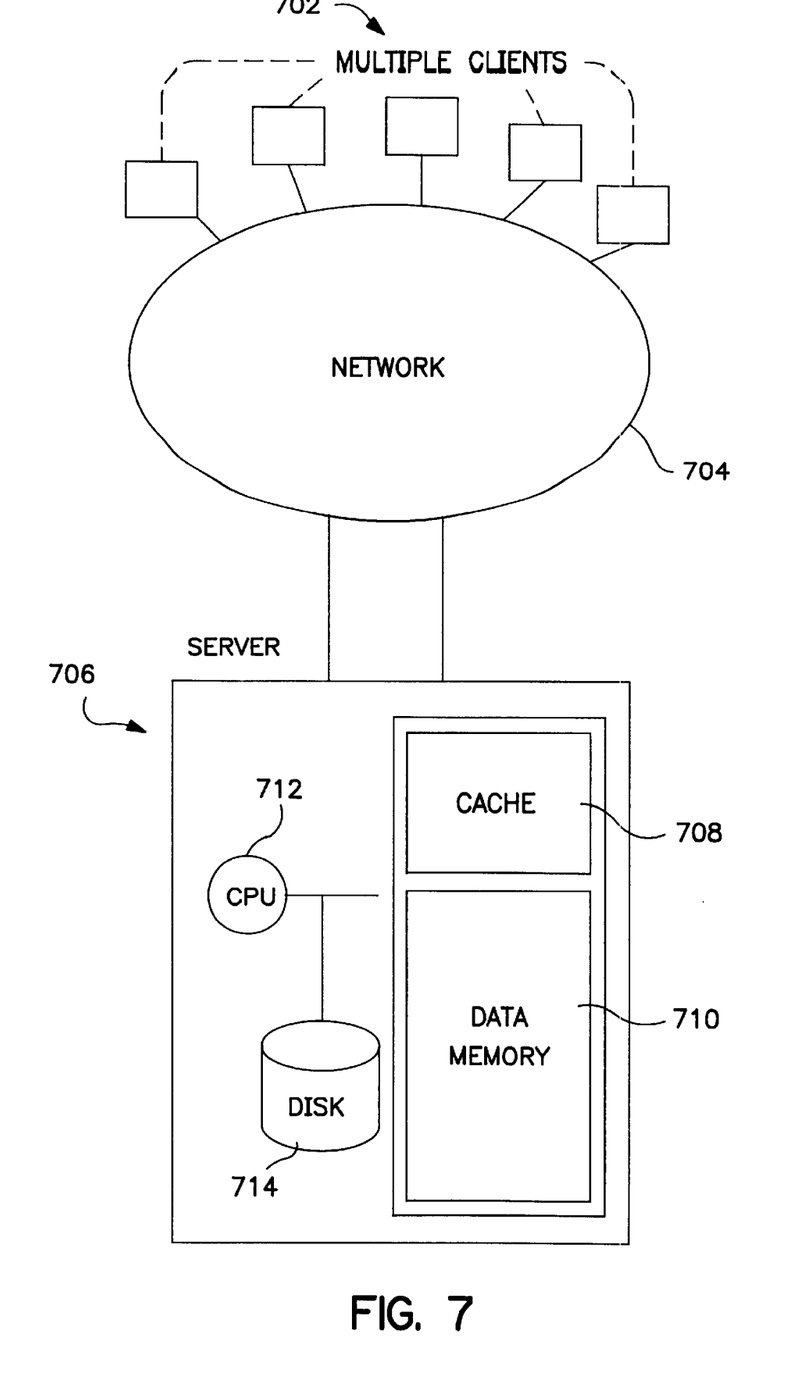
FIG. 7 is a block diagram of an apparatus for analyzing information collected over a computer network in accordance with an exemplary embodiment of the present invention.

FIG. 7 is a block diagram of an apparatus for analyzing information collected over a computer network in accordance with an exemplary embodiment of the present invention. In the embodiment depicted in FIG. 7 objects are multiple client computers 702 that may access a server 706, for example a Web server, over a network 704. The server 706 may have a data memory 710 as well as a cache 708. The server further include a Central Processing Unit (CPU) 712 for processing information and a disk 714 for storing data. Data values are collected from client computers 702 by the server 706 over the network 704. The clients 702 may also query the server 706 regarding the information stored in the data memory 710 and the disk 714. In particular, a client computer may supply the server 706 with a number of clusters k and an average dimensionality value l. The server 706 detects k clusters of information, stored in a database on the disk 714 and in the data memory 710, with an average dimensionality value l and sends the analysis results back to the client computer. The results of the analysis and the clusters of information detected may be displayed to a user at the client computer end, for example, either in the form of text or in graphical form.

Three exemplary software programs may be composed in accordance with the present invention: the first called PROCLUS is a method for detecting k clusters of information with an average dimensionality value l in a database as described above; the second called FindDimensions, used by PROCLUS, is a recipe for finding a subset of the set of features associated with a set of medoids; and the third called EvaluateClusters, also used by PROCLUS, is a recipe for quantitatively evaluating the quality of k potential clusters detected in a database.

Although illustrated and described herein with reference to certain exemplary embodiments, the present invention is nevertheless not intended to be limited to the details shown. Rather, various modifications may be made in the details within the scope and range of equivalents of the claims and without departing from the spirit of the invention.

What is claimed:

1. A method of analyzing information that represents a plurality of objects, said method comprising the steps of:
    identifying a set of features that characterize each of the plurality of objects, said set of features including a plurality of subsets of features;
    storing a plurality of data values in a data base, each of the plurality of data values representing an instance of the set of features;
    detecting a set of clusters of information in the database, each cluster in the set of clusters being detected only by a subset of data values and a corresponding subset of features, each subset of features being specific to a respective cluster.

2. The method according to claim 1, wherein each of the plurality of data values is an n-tuple corresponding to an instance of the set of features.

3. The method according to claim 1, wherein a given cluster in the set of clusters is detected based upon a measure of distance between ones of a given subset of data values in a subspace associated with a given subset of features.

4. The method according to claim 1, wherein each cluster of the set of clusters is defined by a pair consisting of the subset of data values and the corresponding subset of features, the subset of data values consisting of a first subset of ones of the set of the plurality of data values and the corresponding subset of features consisting of a second subset of ones of the set of features.

5. The method according to claim 4, wherein a predetermined number of clusters is detected, and the detected set of clusters has a predetermined average number of features.

6. The method according to claim 1, wherein the plurality of objects are collected by a server connected to a computer network, the server including a data storage unit and a central processing unit.

7. The method according to claim 1, wherein each of the plurality of data values corresponding to at least one of the plurality of objects is obtained by physical measurement of the set of features that characterize the corresponding cluster.

8. The method according to claim 1, wherein the set of clusters of information detected in the database is displayed in the form of text.

9. The method according to claim 1, wherein the set of clusters of information detected in the database is displayed in graphical form.

10. The method according to claim 1, wherein detecting the set of clusters of information in the database comprises the steps of:
(a) generating a set of medoids from ones of the plurality of data values;
(b) associating with each medoid of the set of medoids ones of the set of features, wherein each of said medoid is a data value chosen from the database; and
(c) forming the set of clusters detected in the database by assigning ones of the plurality of data values to each medoid of the set of medoids.

11. The method according to claim 10, wherein detecting the set of clusters of information in the database further comprises the steps of:
generating a set of new medoids by removing one medoid of the set of medoids from the set of medoids and adding one of the plurality of data values to the set of medoids; and
forming a set of new clusters of information detected in the database by repeating said steps (a)–(c) replacing therein the set of medoids with the set of new medoids.

12. The method according to claim 10, wherein the set of medoids is generated by choosing ones of the plurality of data values at random.

13. The method according to claim 10, wherein each medoid of the set of medoids is associated with ones of the set of features by calculating a plurality of distances from each medoid of the set of medoids to a set of data values in a neighborhood of each medoid of the set of medoids with respect to ones of the set of features.

14. The method according to claim 13, wherein each medoid of the set of medoids is associated with ones of the set of features corresponding to a distance of the plurality of distances from each medoid of the set of medoide to a set of data values in a neighborhood of each medoid of the set of medoids with respect to ones of the set of features.

15. The method according to claim 10, wherein detecting the set of clusters of information in the database further comprises the steps of:
generating a set of new medoids by removing one medoid of the set of medoids from the set of medoids and adding one of the plurality of data values to the set of medoids; and
repeating said steps (a) and (b) replacing therein the set of medoids with the set of new medoids, and repeating said step (c) to form a set of new clusters of information detected in the database only if an objective function evaluated with respect to the set of new medoids is less than the objective function evaluated with respect to the set of medoids.

16. The method according to claim 15, wherein the objective function is evaluated with respect to the set of medoids based on a plurality of distances, evaluated with respect to ones of the set of features associated with each medoid of the set of medoids, between each medoid of the set of medoids and ones of the plurality of data values and a plurality of dimensionality values, each of the plurality of dimensionality values corresponding to ones of the set of features associated with each medoid of the set of medoids, and the objective function is evaluated with respect to the set of new medoids based on a plurality of new distances, evaluated with respect to ones of the set of features associated with each new medoid of the set of new medoids, between each new medoid of the set of new medoids and ons of the plurality of data values and a plurality of new dimensionality values, each of the plurality of new dimensionality values corresponding to ones of the set of features associated with each new medoid of the set of new medoids.

17. The method according to claim 10, wherein the set of clusters detected in the database is formed by assigning ones of the plurality of data values to each medoid of the set of medoids based on a distance measure, with respect to ones of the set of features, between ones of the plurality of data values and each medoid of the set of medoids.

18. The method according to claim 1, wherein detecting the set of clusters of information in the database comprises the steps of:
(a) generating a set of medoids from ones of the plurality of data values;
(b) associating with each medoid of the set of medoids ones of the set of features;
(c) forming the set of clusters detected in the database by assigning ones of the plurality of data values to each medoid of the set of medoids;
(d) generating a set of new medoids by removing one medoid of the set of medoids from the set of medoids and adding one of the plurality of data values to the set of medoids;
(e) repeating said steps (a) and (b) replacing therein the set of medoids with the set of new medoids, and repeating said step (c) to form a set of new clusters of information detecting in the database if an objective function evaluated with respect to the set of new medoids is less than the objective function evaluated with respect to the set of new medoids; and
(f) repeating said steps (d) and (e) a plurality of times until the objective function evaluated with respect to the set of new medoids is greater than or equal to the objective function evaluated with respect to the set of medoids for a predetermined number of times of the plurality of times.

19. The method according to claim 1, wherein detecting the set of clusters of information in the database further comprises the steps of:
generating a set of medoids from ones of the plurality of data values; and
deleting from the database ones of the plurality of data values having a segmental distance from each of the set of medoids greater than a predetermined maximum segmental value.

20. A program storage device readable by machine, tangibly embodying a program of instructions executable by the machine to perform method steps for analyzing information that represents a plurality of objects, said method comprising the steps of;
identifying a set of features that characterize each of the plurality of objects, said set of features including a plurality of subsets of features;
storing a plurality of data values in a data base, each of the plurality of data values representing an instance of the set of features;
detecting a set of clusters of information in the database, each cluster in the set of clusters being detected only by a subset of data values and a corresponding subset of features, each subset of features being specific to a respective cluster.

21. The program storage device according to claim 20, wherein each cluster of the set of clusters is defined by a pair consisting of the subset of data values and the corresponding subset of features, the subset of data values consisting of a first subset of ones of the set of the plurality of data values and the corresponding subset of features consisting of a second subset of ones of the set of features.

22. The program storage device according to claim 21, wherein a predetermined number of clusters is detected, and the detected set of clusters has a predetermined average number of features.

23. The program storage device according to claim 20, wherein detecting the set of clusters of information in the database comprises the steps of:
   (a) generating a set of medoids from ones of the plurality of data values, wherein each of said medoid is a data value chosen from the database;
   (b) associating with each medoid of the set of medoids ones of the set of features; and
   (c) forming the set of clusters detected in the database by assigning ones of the plurality of data values to each medoid of the set of medoids.

24. The program storage device according to claim 20, wherein detecting the set of clusters of information in the database comprises the steps of:
   (a) generating a set of medoids from ones of the plurality of data values;
   (b) associating with each medoid of the set of medoids ones of the set of features;
   (c) forming the set of clusters detected in the database by assigning ones of the plurality of data values to each medoid of the set of medoids;
   (d) generating a set of new medoids by removing one medoid of the set of medoids from the set of medoids and adding one of the plurality of data values to the set of medoids;
   (e) repeating said steps (a) and (b) replacing therein the set of medoids with the set of new medoids, and repeating said step (c) to form a set of new clusters of information detecting in the database if an objective function evaluated with respect to the set of new medoids is less than the objective function evaluated with respect to the set of new medoids is less than the objective function evaluated with respect to the set of medoids; and
   (f) repeating said steps (d) and (e) a plurality of times until the objective function evaluated with respect to the set of new medoids is greater than or equal to the objective function evaluated with respect to the set of medoids for a predetermined number of times of the plurality of times.

25. The method according to claim 1, wherein said detecting step, for each cluster in the set of clusters, comprises the steps of:
   (a) generating a set of medoids from ones of the plurality of data values, each medoid of the set of medoids being a data value chosen from the database;
   (b) associating with each medoid of the set of medoids ones of a given feature subset of the set of features; and
   (c) forming the set of clusters detected in the database by assigning ones of the plurality of data values to each medoid of the set of medoids, wherein each medoid of the set of medoids is an anchor data value.

* * * * *